United States Patent
Chiba

(10) Patent No.: US 9,983,573 B2
(45) Date of Patent: May 29, 2018

(54) PROGRAMMABLE CONTROLLER

(75) Inventor: Yasuhiko Chiba, Chiyoda-ku (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 514 days.

(21) Appl. No.: 13/812,574

(22) PCT Filed: Oct. 15, 2010

(86) PCT No.: PCT/JP2010/068181
§ 371 (c)(1),
(2), (4) Date: Jan. 28, 2013

(87) PCT Pub. No.: WO2012/049773
PCT Pub. Date: Apr. 19, 2012

(65) Prior Publication Data
US 2013/0131842 A1    May 23, 2013

(51) Int. Cl.
*G05B 19/418* (2006.01)
*G05B 19/05* (2006.01)

(52) U.S. Cl.
CPC ....... *G05B 19/41845* (2013.01); *G05B 19/05* (2013.01); *G05B 2219/13019* (2013.01)

(58) Field of Classification Search
CPC .............................................. G05B 19/41845
USPC ......................................................... 700/71
See application file for complete search history.

(56) References Cited

U.S. PATENT DOCUMENTS 7,593,938 B2 * 9/2009 Lemar et al.

FOREIGN PATENT DOCUMENTS

| JP | 61-15187 A | 1/1986 | | |
|---|---|---|---|---|
| JP | 4-261583 A | 9/1992 | | |
| JP | 11-52937 A | 2/1999 | | |
| JP | 11-167407 A | 6/1999 | | |
| JP | 2000-227790 A | 8/2000 | | |
| JP | 2001-357031 A | 12/2001 | | |
| JP | 2004-310371 | * 11/2004 | ............. | G06F 12/00 |
| JP | 2004-310371 A | 11/2004 | | |
| JP | 2005-196397 A | 7/2005 | | |

(Continued)

OTHER PUBLICATIONS

English_Translation of Foreign patent JP_2004_310371.*

(Continued)

*Primary Examiner* — Tejal Gami
(74) *Attorney, Agent, or Firm* — Sughrue Mion, PLLC; Richard C. Turner

(57) ABSTRACT

To decode a file name set to a PLC to the same name even if a plurality of external devices using different character-code sets are connected to the PLC, the PLC includes a system unit that actuates the control file using a multilingual character-code set A, a character-code conversion table that associates character codes relating to a plurality of character-code sets with one another for every character, and a character-code management unit that converts description of the name of the control file between the description relating to the multilingual character-code set A and that relating to the local character-code set A using the character-code conversion table when the name of the access-target control file is transferred between the external device using the local character-code set A and the system unit.

5 Claims, 6 Drawing Sheets

(56) References Cited

FOREIGN PATENT DOCUMENTS

JP       2007-121769 A    5/2007

OTHER PUBLICATIONS

Japanese Office Action; dated Jun. 18, 2013; Patent Application No. 2012-538542.
Taiwanese Office Action, dated Sep. 23, 2013, Patent Application No. 100104720.
German Office Action, dated May 23, 2014, Application No. 11 2010 005 940.3.
Gen-itiro Kikui "Identifying the Coding System and Language on On-line Documents on the Internet", pp. 652-657, 1996.
Steven J. Searle, "A Brief History of Character Codes in North America, Europe and East Asia", Web Master, TRON Web, Aug. 6, 2004.
Korean Office Action (Notice of Preliminary Rejection), dated Mar. 18, 2014, Patent Application No. 10-2013-7009016.
Communication dated Jan. 28, 2015, issued by the State Intellectual Property Office of the People's Republic of China in counterpart Application No. 201080069556.6.

* cited by examiner

| CHARACTER-CODE SET ID | 0 | 1 | 2 | 3 | 4 | 5 | ... |
|---|---|---|---|---|---|---|---|
| CHARACTER CODE | ⋮ | ⋮ | ⋮ | ⋮ | ⋮ | ⋮ | ⋮ |
| | 0x3042 | ... | ... | 0x82A0 | 0xA4A2 | ... | ... |
| | 0x3043 | ... | ... | 0x82A1 | 0xA4A3 | ... | ... |
| | 0x3044 | ... | ... | 0x82A2 | 0xA4A4 | ... | ... |
| | ⋮ | ⋮ | ⋮ | ⋮ | ⋮ | ⋮ | ⋮ |

PROGRAMMABLE CONTROLLER

CROSS REFERENCE TO RELATED APPLICATIONS

This application is a National Stage of International Application No. PCT/JP2010/068181, filed on Oct. 15, 2010, the contents of all of which are incorporated herein by reference in their entirety.

FIELD

The present invention relates to a programmable controller that controls an industrial controlled device.

BACKGROUND

A programmable controller (hereinafter, PLC) controls a controlled device based on a user program and parameter files that define various parameters. These control files such as the user program and the parameter files are set by a programming device. Furthermore, not only the programming device but a programmable indicator or the like also refers to these control files. Conventionally, the PLC uses a fixed character-code set for communication with the programming device, the programmable indicator or the like (hereinafter, "external device").

A programmable indicator disclosed in Patent Literature 1 includes a plurality of sets of font data. Patent Literature 1 discloses a technique for switching the font data based on typeface identification information indicating a typeface of which country the characters are to be indicated. According to this technique, when an information process is performed using a common character-code set such as UNICODE, the characters can be indicated in an appropriate typeface even in a case where the typeface of the same code differs, by means of fonts of standard use depending on the countries to be used, for example.

CITATION LIST

Patent Literature

Patent Literature 1: Japanese Patent Application Laid-open No. 2000-227790

SUMMARY

Technical Problem

However, the same character-code set is not always used for external devices connected to the PLC. It is assumed that a plurality of external devices using different character-code sets are connected to the PLC to which a usable character-code set is fixed to a specific code set. In this case, when the name of a file set by one of the external devices is to be read by another external device, so-called character corruption occurs in which the file name is not decoded into the same file name and another external device is disadvantageously unable to identify the file set to the PLC.

The present invention has been achieved to solve the above problems, and an object of the present invention is to provide a programmable controller (PLC) capable of decoding the name of a file set to the PLC into the same name even if a plurality of external devices using mutually different character-code sets are connected to the PLC.

Solution to Problem

In order to solve the aforementioned problems, a programmable controller that controls an industrial controlled device according to one aspect of the present invention is configured to include: a storage unit that stores therein a control file for controlling the controlled device, to which a name described in character code relating to a first encoding method is assigned; a system unit that accesses the control file stored in the storage unit in response to a request from an external device; a character-code conversion table that associates character codes relating to a plurality of encoding methods including the first encoding method with one another for every character code decoded to the same character; and a character-code management unit which, in a case where an external device using a second encoding method different from the first encoding method is connected to the programmable controller and the character codes relating to the first encoding method are associated with character codes relating to the second encoding method one another in the character-code conversion table, converts an encoding method for a character code used to describe the name of a control file between the first encoding method and the second encoding method using the character-code conversion table at the time of transferring the name of the control file to be accessed between the external device and the system unit.

Advantageous Effects of Invention

As long as the character-code conversion table associates the character codes of an encoding method used by an external device with those relating to a first encoding method, the programmable controller according to the present invention can decode the name of a control file to the same name when an external device using different encoding method is connected to the PLC. Therefore, it is possible to decode the name of the file set to the PLC into the same name even if a plurality of external devices using mutually different character-code sets are connected to the PLC.

DESCRIPTION OF EMBODIMENTS

Exemplary embodiments of a PLC according to the present invention will be explained below in detail with reference to the accompanying drawings. The present invention is not limited to the embodiments.

Embodiment

Figure 1:
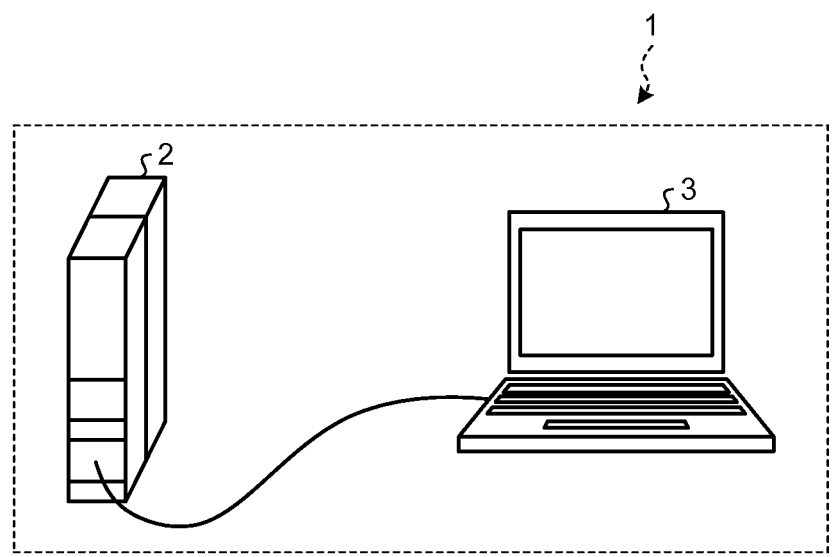
FIG. 1 depicts a configuration of a PLC system configured to use a PLC according to an embodiment of the present invention.

FIG. 1 depicts a configuration of a PLC system configured to use a PLC according to an embodiment of the present invention. As shown in FIG. 1, a PLC system 1 is configured so that a PLC 2 is connected to a programming device 3. The connection between the PLC 2 and the programming device 3 is not limited to a specific method, but serial connection such as USB or Ethernet®, for example, is also applicable. The programming device that sets control files such as a user program and parameter files to the PLC 2 is described here as an example of an external device. However, the concept of the external device connected to the PLC 2 according to the present embodiment also embraces a programmable indicator that refers to a state of devices of the PLC 2 and to the control files set to the PLC 2.

Figure 2:
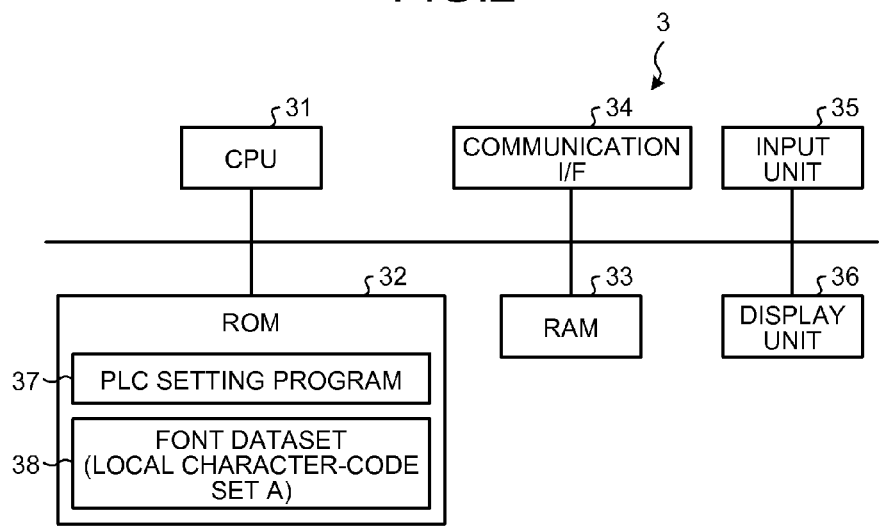
FIG. 2 is an explanatory diagram of an example of a hardware configuration of a programming device.

FIG. 2 is an explanatory diagram of an example of a hardware configuration of the programming device 3. The programming device 3 has a general computer configuration in which a CPU (Central Processing Unit) 31, a ROM (Read Only Memory) 32, a RAM (Random Access Memory) 33, a communication I/F 34, an input unit 35, and a display unit 36 are connected to one another by a bus.

The display unit 36, which is a display device such as a liquid crystal display, displays output information such as an operation screen for a user based on an instruction from the CPU 31. The input unit 35 is configured to include a mouse and a keyboard, and an operation of the user for the programming device 3 is input to the input unit 35. The operation information input to the input unit 35 is transmitted to the CPU 31. The communication I/F 34 is a communication interface for the communication between the programming device 3 and the PLC 2.

The RAM 33 is configured by a high-speed storage device such as a DRAM (Dynamic Random Access Memory) or an SRAM (Static Random Access Memory). The ROM 32 stores therein a PLC setting program 37 and a font dataset 38. The PLC setting program 37 is a computer program for setting the PLC 2. The font dataset 38 is an aggregate of image data (font data) for each character, and the image data for each character is associated with a code for each character included in a character-code set (a local character-code set A in the present embodiment) that defines a specific encoding method. Any character-code set is usable as the local character-code set A. As Japanese local character-code sets, ISO-2022-JP (JIS), Shift-JIS, EUC-JP and the like are widely used, and one of these can be used as the local character-code set.

The PLC setting program 37 and the font dataset 38 are loaded into the RAM 33 by the CPU 31 via a bus line. The CPU 31 executes the PLC setting program 37 loaded into the RAM 33. At the time of setting the PLC 2 using the PLC setting program 37, the CPU 31 uses the encoding method defined by the local character-code set A. That is, characters that constitute the name of a control file (hereinafter, simply "files") to be output are encoded by using the encoding method defined by the local character-code set A. When displaying the name of the file on the display unit 36, the CPU 31 acquires font data corresponding to the codes of the respective characters that constitute the name of the file from the font dataset 38, and displays the name of the file on the display unit 36 using the thus acquired font data. For example, when the local character-code set A defines Shift-JIS and a character code "0x82A0" in Shift-JIS is described, the CPU 31 acquires font data for "あ" associated with "0x82A0" from the font dataset 38, and displays "あ" on the display unit 36. That is, "0x82A0" is decoded into "あ". The created file is transmitted to the PLC 2 via the communication I/F 34 in response to a command from the CPU 31.

The programming device 3 inputs the file created based on the local character-code set A to the PLC 2. When a file name encoded by using the local character-code set A is input to the PLC 2, the PLC 2 converts the input file name into a description using a specific character-code set (a multilingual character-code set A in the present embodiment), so that the description can be decoded into the same file name, and stores therein the file name obtained by the conversion. As the multilingual character-code set A, a Unicode encoding method such as UTF-8 or UTF-16 can be used. At the time of transmitting the file name to the programming device 3, the PLC 2 converts the file name described in the multilingual character-code set A into file name described in the local character-code set A, and transmits the converted file name to the programming device 3.

Furthermore, if another programming device 3 using a character-code set (a local character-code set B, for example) different from the local character-code set A is connected to the PLC 2 and the PLC 2 transmits or receives the file name to or from the programming device 3, the PLC 2 converts the file name described in the multilingual character-code set A into the file name described in the local character-code set B. The PLC 2 can thereby decode the file name of the file set to the PLC 2 into the same file name whichever of the local character-code set A or the local character-code set B the programming device 3 uses.

Figure 3:
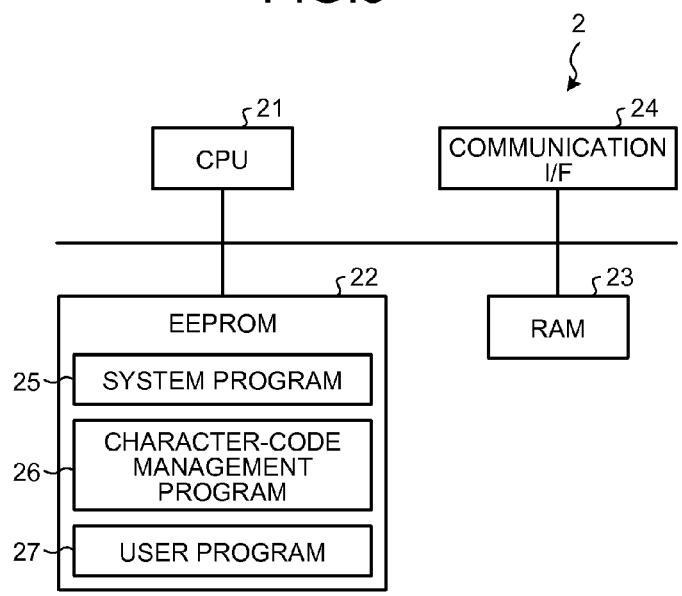
FIG. 3 is an explanatory diagram of an example of a hardware configuration of the PLC.

FIG. 3 is an explanatory diagram of an example of a hardware configuration of the PLC 2. As shown in FIG. 3, the PLC 2 includes a CPU 21, an EEPROM (Electrically Erasable and Programmable Read Only Memory) 22, a RAM 23, and a communication I/F 24. The CPU 21, the EEPROM 22, the RAM 23, and the communication I/F 24 are connected to one another by a bus.

The EEPROM 22 stores therein a user program 27 that serves as the control file set by the programming device 3, a system program 25 that not only actuates the user program 27 but executes a control over basic operations performed by the entire PLC 2 as well, and a character-code management program 26 that is a computer program for the conversion between the character-code set used by each external device connected to the PLC 2 and the multilingual character-code set A. The parameter file is also stored in the EEPROM 22 similarly to the user program 27 although not shown in FIG. 3.

The RAM 23 is configured by a high-speed storage device such as a DRAM or an SRAM. The CPU 21 reads the system program 25, the character-code management program 26, and the user program 27 from the EEPROM 22 and loads these programs into the RAM 23. At the time of setting the user program 27, the CPU 21 responds to various requests from the programming device 3 based on the system program 25 loaded into the RAM 23. When a file name is input to or output from the programming device 3 during the setting, the CPU 21 executes the character-code management program 26 and converts the coding method for the input/output-target file name. At the time of executing the user program 27, the CPU 21 executes the user program 27 loaded into the RAM 23 under control of the system program 25 and executes writing/reading of data (device data) input or output to or from a controlled device. The device data is stored in a predetermined area secured in the RAM 23, for example.

The communication I/F 24 is a communication interface for connecting the external device such as the programming device 3 to the PLC 2.

Figure 4:
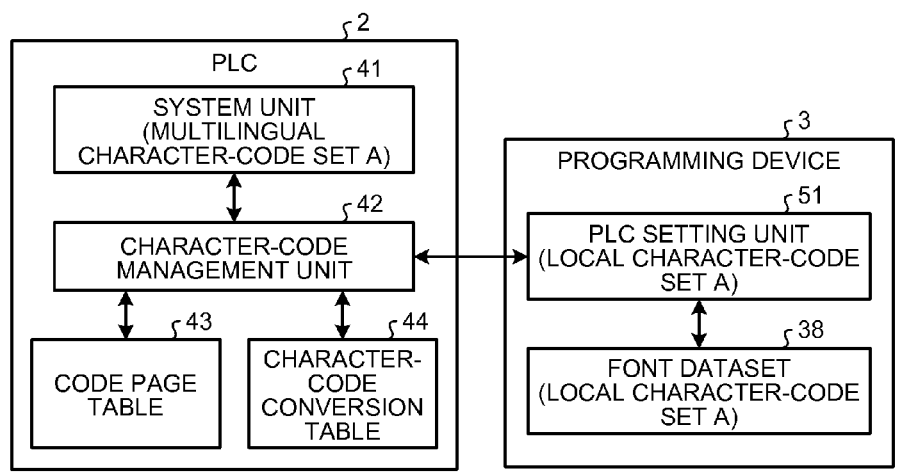
FIG. 4 is an explanatory diagram of a functional configuration of a PLC system according to the embodiment of the present invention.

FIG. 4 is an explanatory diagram of a functional configuration of the PLC system 1 according to the embodiment of the present invention. As shown in FIG. 4, the PLC 2 includes a system unit 41, a character-code management unit 42, a code page table 43, and a character-code conversion table 44. The system unit 41 is realized within the RAM 23 by executing the system program 25. The character-code management unit 42, the code page table 43, and the character-code conversion table 44 are realized within the RAM 23 by executing the character-code management program 26. The code page table 43 or the character-code conversion table 44 can be left in the EEPROM 22 without being loaded into the RAM 23.

The system unit 41 performs various access processes including creation, deletion, output, and the like of the user program 27 in response to the respective requests from the programming device 3. The system unit 41 manages the name of the user program 27 using the multilingual character-code set A. That is, the name described in the character codes relating to the encoding method defined by the multilingual character-code set A is added to each of the control files stored in the EEPROM 22.

Figure 5:
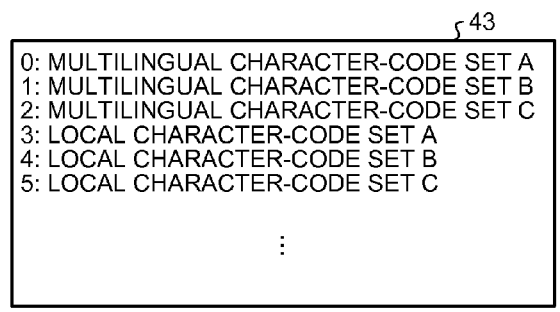
FIG. 5 is an example of a data structure of a code page table.

The code page table 43 is a table in which a list of character-code sets is described for a plurality of character-code sets by means of which the PLC 2 can convert. FIG. 5 is an example of a data structure of the code page table 43. As shown in FIG. 5, identification numbers starting from 0 are allocated to the multilingual character-code set A, the multilingual character-code set B, a multilingual character-code set C, the local character-code set A, the local character-code set B, and a local character-code set C in order, respectively and registered in the code page table 43. The identification numbers registered in the code page table 43 can be made uniform to numbers equal to widely known code page numbers.

Figures 6, 7:
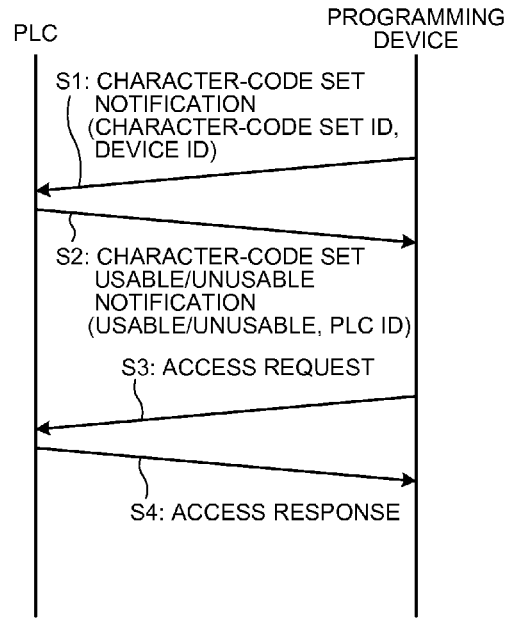
FIG. 6 is an explanatory diagram of an example of a data structure of a character-code conversion table.
FIG. 7 is an explanatory diagram of a communication procedure for setting a character-code set performed by the PLC system.

The character-code conversion table 44 is a table that describes the correspondence among different character-code sets for each of the characters decoded to the same characters. FIG. 6 is an explanatory diagram of an example of a data structure of the character-code conversion table 44. As shown in FIG. 6, the character-code conversion table 44 has a table configuration in which the identification numbers of the character-code sets are described on the first line. Each entry indicates to what character code each of the characters that are decoded to the same characters is encoded in each character-code set. The table shown in FIG. 6 indicates the correspondence, assuming that the identification number 0 (a multilingual character code set A) defines UTF-16 that is one type of UNICODE, the identification number 3 (a local character code set A) defines Shift-JIS, and the identification number 4 (a local character code set B) defines EUC-JP. For example, as evident from the table shown in FIG. 6, "0x3042" in UTF-16 is the character code decoded to a Japanese character hiragana "あ", and that the character "あ" is described as "0x82A0" in Shift-JIS and "0xA4A2" in EUC-JP.

The character-code management unit 42 performs a communication procedure for setting the character-code sets used between the PLC 2 and the programming device 3. In this communication procedure, the identification numbers registered in the code page table 43 are used. The character-code management unit 42 sets the character-code set having the identification number transmitted through the communication procedure to a character-code set to be used for subsequent communication. The character-code management unit 42 can store the received identification number in the RAM 23 as a set content of the character-code set. Upon reception of the file name together with a request from the programming device 3 after the communication procedure, the character-code management unit 42 converts the encoding method for the file name from the previously-set character-code set (in this case, the local character-code set A is set) into the multilingual character-code set A, and transmits the request together with the converted file name to the system unit 41. Upon reception of a response as well as the file name from the system unit 41, the character-code management unit 42 converts the encoding method for the received file name from the multilingual character-code set A into the local character-code set A, and transmits the converted file names together with a response to the programming device 3. Examples of the request accompanied by the file names include a read request and a write request to the PLC 2. Examples of the response accompanied by the file names include a response to a request to display a list of the names of control files.

The programming device 3 includes a PLC setting unit 51. The PLC setting unit 51 is generated within the RAM 33 by executing the PLC setting program 37. The PLC setting unit 51 performs setting of the PLC 2 including a setting of the user program 27. The PLC setting unit 51 encodes the file name of the user program 27 using the local character-code set A. When displaying the encoded file name on the display unit 36, the PLC setting unit 51 displays the file name using the font dataset 38.

Figure 8:
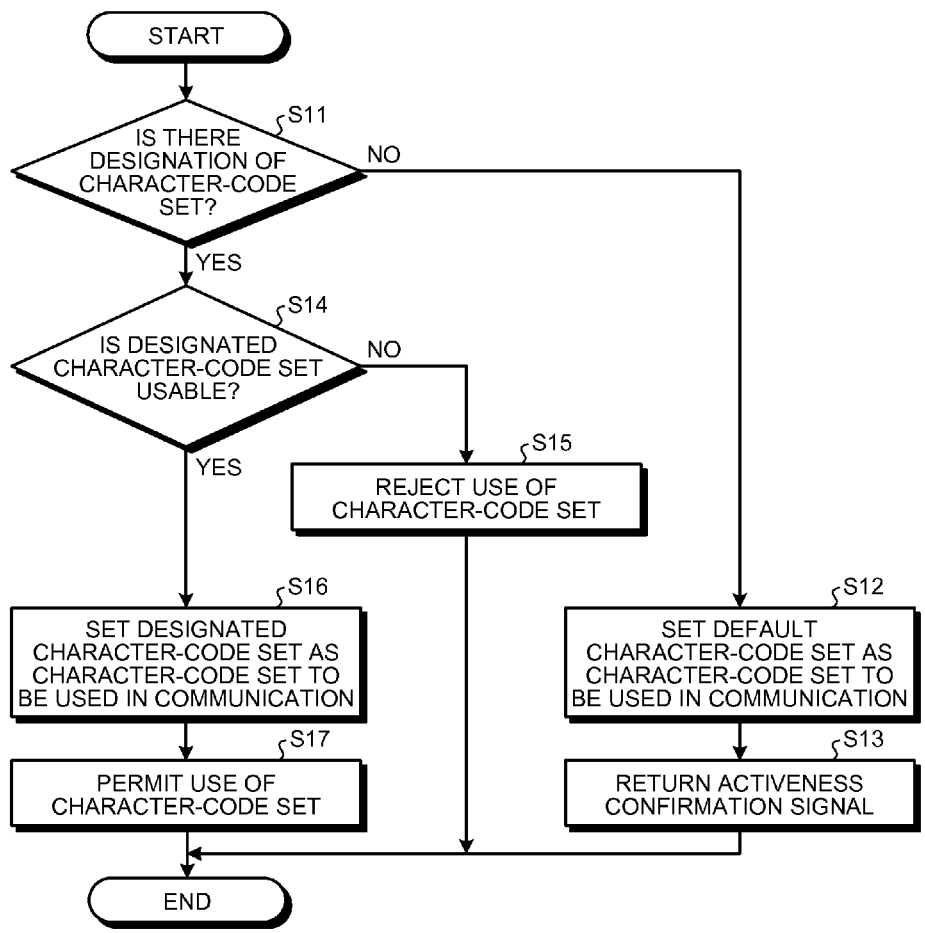
FIG. 8 is a flowchart for explaining operations performed by the PLC according to the embodiment of the present invention.
Figure 9:
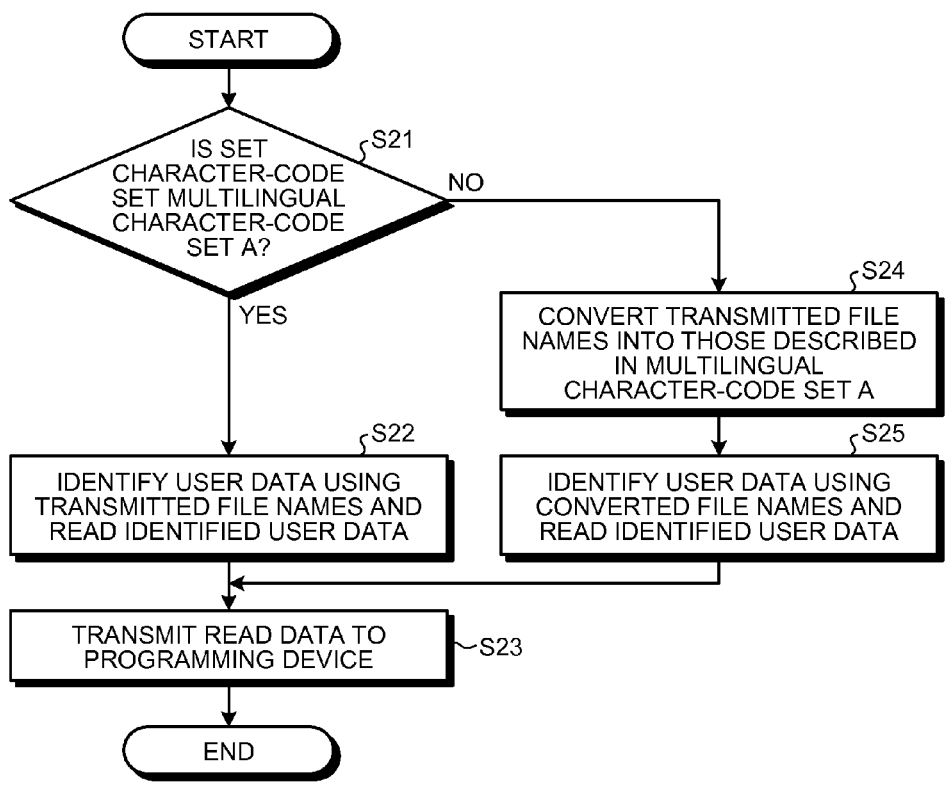
FIG. 9 is a flowchart for explaining the operations performed by the PLC according to the embodiment of the present invention.

With reference to FIGS. 7 to 9, operations performed by the PLC 2 according to the embodiment of the present invention are described next.

FIG. 7 is an explanatory diagram of the communication procedure for setting the character-code set performed by the PLC system 1. As shown in FIG. 7, the programming device 3 first notifies the PLC 2 of the character-code set (a character-code set notification) before accessing the PLC 2 (Step S1). The character-code set notification includes the identification number of the local character-code set A used by the programming device 3 and a device identification number of the programming device 3.

Some PLC systems are designed to transmit and receive an activeness confirmation signal for confirming whether or not the communication connecting the PLC to an external device is active at the time of holding communication between the PLC and the external device. In the present embodiment, it is assumed that the character-code set notification includes the identification number of the local character-code set in the activeness confirmation signal transmitted from the external device to the PLC 2. That is, the activeness confirmation signal from the external device incompatible with specifications of performing the communication procedure for setting the character-code set is recognized as the character-code set notification in which the character-code set is not designated. Upon reception of the character-code set notification, the PLC 2 returns a usable/unusable notification indicating whether the local character-code set A is usable as a response. The character-code set usable/unusable notification includes indication as to whether the local character-code set A is usable or unusable and the device identification number of the PLC 2.

FIG. 8 is a flowchart for explaining the operations performed by the PLC 2 since the PLC 2 receives the character-code set notification at Step S1 until transmitting, as the response, the character-code set usable/unusable notification at Step S2 in more detail. As shown in FIG. 8, upon reception of the character-code set notification, the character-code management unit 42 determines whether the character-code set notification includes the designation of the character-code set to be used (Step S11). When the designation of character-code set to be used is not included in the character-code set notification (NO at Step S11), the character-code management unit 42 sets a default character-code set as the character-code set to be used (Step S12). The character-code management unit 42 then returns the character-code set usable/unusable notification that does not include the indication as to whether the character-code set is usable or unusable in response to the character-code set notification (Step S13), and the operations up to Step S2 are ended. When receiving character-code set usable/unusable notification that does not include the indication as to whether the character-code set is usable or unusable, the PLC setting unit 51 recognizes that the communication with the PLC 2 is active.

As the default character-code set, a character-code set that is conventionally fixedly used in the PLC 2 can be used. With this setting, even a conventional external device incompatible with the specifications for designating the character-code set can be connected to the PLC 2 and used as it is.

When the designation of the character-code set is included (YES at Step S11), the character-code management unit 42 determines whether the designated character-code set is usable, that is, determines whether the character codes of the designated character-code set is associated with other character-code sets by the character-code conversion table 44 (Step S14). In the present embodiment, the identification numbers of the usable character-code sets are registered in the code page table 43. Accordingly, the character-code management unit 42 can determine whether the designated character-code set is usable by referring to the code page table 43. When the designated character-code set is unusable (NO at Step S14), the character-code management unit 42 transmits a character-code set usable/unusable notification indicating rejection of the use of the designated character-code set to the programming device 3 (Step S15), and the operations are ended. When the designated character-code set is usable (YES at Step S14), the character-code management unit 42 sets the designated character-code set as the character-code set to be used (Step S16). The character-code management unit 42 transmits a character-code set usable/unusable notification indicating allowance of the use of the designated character-code set to the programming device 3 (Step S17), and the operations are ended.

Upon reception of the character-code set usable/unusable notification indicating the rejection of the use of the designated character-code set at Step S2, the programming device 3 is made unable to conduct the subsequent communication. Upon reception of the character-code set usable/unusable notification indicating the allowance of the use of the designated character-code set, the programming device 3 is enabled to conduct the subsequent communication. That is, the programming device 3 transmits a desired access request to the PLC 2 by a user's operation (Step S3). Upon reception of the access request, the PLC 2 returns an access response to the access request to the programming device 3 (Step S4).

FIG. 9 is a flowchart for explaining a read operation performed by the PLC 2 when the PLC 2 receives a file read request as an example of the access request. As shown in FIG. 9, upon reception of the read request, the character-code management unit 42 determines whether the set character-code set is the multilingual character code set A (Step S21). When the multilingual character-code set A is set (YES at Step S21), the character-code management unit 42 transfers the read request to the system unit 41. The system unit 41 specifies the read-target file using the file name of the read-target file included in the read request transferred from the character-code management unit 42, and reads the specified file (Step S22). The character-code management unit 42 transmits the read file to the programming device 3 as an access response (Step S23), and the read operation is ended.

When the set character-code set is not the multilingual character-code set A (NO at Step S21), the character-code management unit 42 converts the code of each of the characters that constitute the file name included in the transmitted read request into the code described in the multilingual character-code set A by using the character-code conversion table 44 (Step S24). The character-code management unit 42 transfers the read request including the converted file name to the system unit 41. Furthermore, the system unit 41 specifies the read-target file using the converted file name and reads the specified file name (Step S25). Thereafter, the operation proceeds to Step S23, at which the character-code management unit 42 transmits the read file to the programming device 3, and the read operation is ended.

While the operation of the read request has been described above, even when having received a write request, the character-code management unit 42 converts the name of write-target file described in character code relating to the local character-code set A into the one using the multilingual character-code set A after an operation similar to that at Step S21. The write-target file is stored in the EEPROM 22 while the converted name is assigned to the write-target file. Furthermore, upon reception of a list display request, the character-code management unit 42 converts the name of the file stored in the EEPROM 22 and transmits the converted file name to the programming device 3 after the similar operation to that at Step S21.

The timing for performing the communication procedures at Steps S1 and S2 is not limited to any specific timing. For example, the PLC 2 can perform the communication procedures for every access request before the programming device 3 issues an access request to the PLC 2 or can perform the communication procedures at a predetermined time interval. Moreover, if the programming device 3 is configured to be able to use a plurality of character-code sets, the PLC 2 can perform the communication procedures when the programming device 3 changes the character-code set to be used.

In the above descriptions, the programming device 3 uses the character-code set for a local language and the PLC 2 uses the multilingual character-code set. Accordingly, when the external device uses a local character-code set of the same language as that of the local character-code set A or a multilingual character-code set that supports the language, the external device can decode the file name set by using the local character-code set A into the same file name as that used at the time of setting. That is, even the file name set by an external device using, for example, Shift-JIS can be decoded to the same file name by an external device using EUC-JP or JIS. Moreover, by using an external device that uses the multilingual character-code set, even the file name set in the local character code of whatever language supported by the character-code set can be decoded into the same file name as that used at the time of setting.

The character-code set used by the system unit 41 of the PLC 2 can be used as the character-code set of the local language. In this case, the file name can be decoded into the same file name as that used at the time of setting, only when the external device uses the character-code set of the same language as the local language.

As described above, according to the embodiment of the present invention, the PLC 2 is configured to include the system unit 41 that actuates the control file using the multilingual character-code set A, the character-code conversion table 44 that associates the character codes of a plurality of character-code sets with one another for every character, and the character-code management unit 42 that converts the description of the name of the control file between the description relating to the multilingual character-code set A and that relating to the local character-code set A by using the character-code conversion table 44 when the name of the access-target control file is transferred between the external device using the local character-code set A and the system unit 41. Accordingly, even if an external device that uses a character-code set that is different from the local character-code set A and for which the correspondence is described in the character-code conversion table 44 refers to the control file set by the external device that uses the local character-code set A, the file name is decoded into the same file name as that used at the time of setting. That is, even if a plurality of external devices using different character-code sets are connected to the PLC, the external devices can decode the name of the file set to the PLC to the same name.

The PLC 2 is also configured as follows. When the external device issues an access request, the character-code management unit 42 transmits a character-code set usable/unusable notification indicating allowance of the use of a designated character-code set to the external device upon reception of the character-code set notification from the connected external device. When performing the transfer of the name of the control file after transmitting the character-code set usable/unusable notification, the character-code management unit 42 performs conversion of the encoding method of the name of the control file. The character-code set usable/unusable notification also serves as the activeness confirmation signal for the communication with the external device. The character-code management unit 42 converts the name of the control file between the name described using the multilingual character-code set A and the names described by using a character-code set that is set by default at the time of performing the transfer of the name of the control file if the character-code set usable/unusable notification does not include the designation of the character-code set. Therefore, it is possible to connect an external device of a conventional type that is not configured to transmit the character-code set to be used to the PLC 2.

INDUSTRIAL APPLICABILITY

As described above, the programmable controller according to the present invention is preferable to be applied to a programmable controller that controls industrial controlled device.

REFERENCE SIGNS LIST

1 PLC system
2 PLC
3 programming device
21 CPU
22 EEPROM
23 RAM
24 communication I/F
25 system program
26 character-code management program
27 user program
31 CPU
32 ROM
33 RAM
34 communication I/F
35 input unit
36 display unit
37 PLC setting unit
38 font dataset
41 system unit
42 character-code management unit
43 code page table
44 character-code conversion table
51 PLC setting unit

The invention claimed is:

1. A programmable logic controller (PLC) that controls an industrial controlled device, comprising:
   a storage unit that stores therein a control file for controlling the industrial controlled device, to which a name described in character code relating to a first encoding method is assigned;
   a system unit that accesses the control file stored in the storage unit in response to a request from an external industrial controlled device;
   a character-code conversion table that associates character codes relating to a plurality of encoding methods including the first encoding method with one another for the character codes decoded to the same character; and
   a character-code management unit which, in a case where the external industrial controlled device using a second encoding method different from the first encoding method is connected to the PLC and the character codes relating to the first encoding method are associated with character codes relating to the second encoding method with one another in the character-code conversion table, converts an encoding method for a character code used to describe the name of the control file between the first encoding method and the second encoding method using the character-code conversion table at the time of transferring the name of the control file to be accessed between the external industrial controlled device and the system unit,
   wherein the character-code management unit, in response to receiving an activeness confirmation signal, which is a signal that confirms whether a communication channel between the external industrial controlled device and the PLC is active,
      determines whether an encoding-method notification indicating designation of the second encoding method from the external industrial controlled device is included in the activeness confirmation signal,
      when it is determined that the encoding-method notification is not included in the activeness confirmation signal, sets a usage-permission notification indicating allowance of use of the second encoding method into the activeness confirmation signal, and transmits the activeness confirmation signal to the external industrial controlled device connected to the PLC, and
   wherein the PLC controls a physical movement operation of the external industrial controlled device, based on information stored in the control file, the information being transmitted over the communication channel.

2. The PLC according to claim 1, wherein the character-code management unit performs conversion of the encoding method of the name of the control file when performing a transfer of the name of the control file after transmitting the usage-permission notification.

3. The PLC according to claim 2, further comprising a list of the encoding methods, in which mutual correspondence of the encoding methods is described in the character-code conversion table and, wherein the character-code management unit determines whether the character codes relating to the first encoding method are associated with the character codes relating to the second encoding method in the character-code conversion table by referring to the list upon reception of the encoding-method notification, and transmits the usage-permission notification when determining that the character codes are associated with one another.

4. The PLC according to claim 3, wherein the list of the encoding methods is a list of identification numbers of the encoding methods, and the encoding-method notification includes an identification number of the second encoding method.

5. The PLC according to claim 3, wherein the character-code management unit converts, if the encoding-method notification does not include the designation of any encoding method, the name of the control file between the name described in the first encoding method and the name described in a preset encoding method at the time of performing the transfer of the name of the control file.

* * * * *